United States Patent Office 3,576,874
Patented Apr. 27, 1971

3,576,874
2,2'''-[(4,4 - DIPHENYL-3-BUTEN- AND - BUTYL-IDENE) BIS (p-PHENYLENEOXY)]BIS TRIETHYL-AMINES
Josef Fried, Chicago, Ill., and Edward Joseph Pribyl, Metuchen, N.J., assignors to E. R. Squibb & Sons, Inc., New York, N.Y.
No Drawing. Continuation-in-part of applications Ser. No. 288,630, June 18, 1963, and Ser. No. 566,207, July 19, 1966. This application Sept. 27, 1967, Ser. No. 671,094
Int. Cl. C07c 87/28
U.S. Cl. 260—570
14 Claims

ABSTRACT OF THE DISCLOSURE

A compound of the formula:

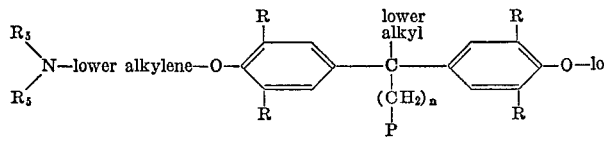

wherein P represents a radical of the group consisting of:

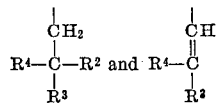

each R is a member of the group consisting of hydrogen, hydroxy, nitro, lower alkyl, lower alkoxy, lower alkanoyl, halo and diloweralkylamino-lower alkylene; $R^2$ is a member of the group consisting of hydrogen and hydroxy; $R^3$ is a member of the group consisting of hydrogen, lower alkyl, lower alkenyl, lower alkynyl, $(R)_m$-phenyl,$(R)_m$-naphthyl, $(R)_m$-phenyl-lower alkyl, $(R)_m$-naphthyl-lower alkyl, cycloalkyl of 3 to 7 carbon atoms, and cycloalkyl-lower alkyl, wherein the cycloalkyl has 3 to 7 carbon atoms; $R^4$ is a member of the group consisting of lower alkyl, lower alkenyl, lower alkynyl, $(R)_m$-phenyl, $(R)_m$-naphthyl, $(R)_m$-phenyl-lower alkyl $(R)_m$-naphthyl-lower alkyl, cycloalkyl of 3 to 7 carbon atoms, and cycloalkyl-lower alkyl, wherein the cycloalkyl has 3 to 7 carbon atoms; each $R^5$ is a member of the group consisting of hydrogen, lower alkyl, hydroxy-lower alkyl, and phenyl-lower alkyl; $m$ is an integer from 0 to 3; and $n$ is an integer from 1 to 5; and acid-addition salts thereof, the aforesaid compound inhibits cholesterol biosynthesis.

This application is a continuation-in-part of application Ser. No. 566,207, filed July 19, 1966, which in turn is a continuation-in-part of application Ser. No. 288,630, filed June 18, 1963, both now abandoned.

SUMMARY OF THE INVENTION

This invention relates to bis(p-hydroxyaryl)alkanoic acids. More particularly the invention relates to new compounds of the formula (I)
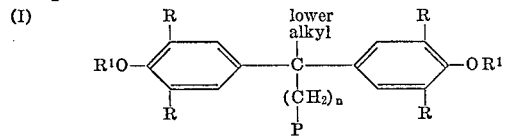

and to acid addition salts thereof.
The symbols in Formula I have the following meanings:
P represents the radicals

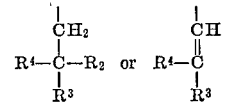

R represents hydrogen, hydroxy, nitro, lower alkyl, lower alkoxy, lower alkanoyl, halo and dialkylamino-lower alkylene.
$R^1$ represents hydrogen, lower alkyl and lower alkylene-B.
$R^2$ represents hydrogen and hydroxy.
$R^3$ represents hydrogen, lower alkyl, lower alkenyl, lower alkynyl, aryl, cycloalkyl, aralkyl, cycloalkyl-lower alkyl, thienyl, pyridyl, thienyl-lower alkyl and pyridyl-lower alkyl.
$R^2$ and $R^3$ together also represent oxo, i.e., the oxygen atom of the keto group.
$R^4$ represents lower alkyl, lower alkenyl, lower alkynyl, aryl, cycloalkyl, aralkyl, cycloalkyl-lower alkyl, thienyl, pyridyl, thienyl-lower alkyl and pyridyl-lower alkyl.
B represents a basic nitrogen containing radical of less than 12 carbon atoms.
$n$ is 1 to 5

The lower alkyl groups represented by the symbols referred to above include straight and branched chain saturated aliphatic groups such as methyl, ethyl, propyl, isopropyl, butyl, isobutyl, t-butyl, amyl, isoamyl, hexyl and the like. Methyl and ethyl are preferred. The lower alkoxy groups contain alkyl groups of the same character attached to an oxygen atom. Similarly, the lower alkylene groups are divalent radicals of the same kind. The lower alkenyl and lower alkenylene groups are mono-unsaturated groups corresponding to the lower alkyl groups and include for example propenyl, isopropenyl, butenyl, isobutenyl and the like. The lower alkynyl groups are similar to the foregoing but with a triple bond, as propargyl and the like. The lower alkanoyl groups are the acyl radicals of the lower fatty acids, including for example, acetyl, propionyl, butyryl, etc.

Each of the four halogens is contemplated by the term "halo," but chlorine and bromine are preferred.

The cycloalkyl groups are saturated aliphatic groups, containing preferably 3 to 7 carbon atoms, including for example, cyclopropyl, cyclobutyl, cyclopentyl, cyclohexyl and cycloheptyl. The cycloalkyl lower alkyl groups are similar including, for example, cyclopropylmethyl, cyclohexylmethyl and the like.

The aryl groups are monocyclic or bicyclic aromatic hydrocarbon radicals, e.g., phenyl and naphthyl which may also contain 1 to 3 substituents represented by the symbol R. They may be represented by the symbol $(R)_m$-phenyl and $(R)_m$-naphthyl, $m$ representing 0 to 3. Illustrative of the substituted aryl groups are the following: o-, m- and p-bromophenyl, o-, m- and p-nitrophenyl, 3,4-dinitrophenyl, 2,3-dichlorophenyl, 2,3-dibromophenyl, 3,4-dichlorophenyl, o-, m- and p-hydroxyphenyl, o-, m- and p-tolyl, o-, m- and p-xylyl, mesityl, p-methoxyphenyl, p-ethoxyphenyl, p-acetylphenyl, o-, m- and p-trifluoromethylphenyl, trichlorophenyl, o-, m- and p-trichloromethylphenyl, 3,4 di(trifluoromethyl)phenyl, chloronaphthyl, bromonaphthyl, dichloronaphthyl, trifluoromethylnaphthyl and the like.

The basic nitrogen containing radicals symbolized by B may be represented by the formula

wherein each $R^5$ represents hydrogen, lower alkyl, hydroxy-lower alkyl and phenyl-lower alkyl forming such basic groups as amino, lower alkylamino, e.g., methylamino, ethylamino, di(lower alkyl)amino, e.g., dimethylamino, diethylamino, dipropylamino, (hydroxy-lower alkyl)amino, e.g., hydroxyethylamino, di(hydroxy-lower alkyl)amino, e.g., di(hydroxyethyl)amino, phenyl(lower alkyl)amino, e.g., benzylamino, phenethylamino, N-(lower alkyl)phenyl(lower alkyl)amino, e.g., N-methylbenzylamino, and the like.

In addition, the nitrogen may join with groups represented by $R^5$ to form a 5 to 7 membered monocyclic heterocyclic containing, if desired, an oxygen, sulfur or an additional nitrogen atom, (not more than two hetero atoms altogether), that is, the two symbols $R^5$ represent together tetramethylene, pentamethylene, hexamethylene, oxatetramethylene, oxapentamethylene, azahexamethylene, azatetramethylene, azapentamethylene, thiapentamethylene or thiatetramethylene. The heterocyclic group may also be substituted by one or two groups represented by R and hydroxy-lower alkyl and lower alkanoyloxy-lower alkyl in addition.

Thus heterocyclic groups represented by B include, for example, piperidino, (lower alkyl)piperidino, e.g., dimethylpiperidino, (lower alkoxy)piperidino, e.g., methoxypiperidino, pyrrolidino, (lower alkyl)pyrrolidino, e.g., methylpyrrolidino, di(lower alkyl)pyrrolidino, e.g., dimethylpyrrolidino, (lower alkoxy)pyrrolidino, e.g., ethoxypyrrolidino, morpholino, (lower alkyl)morpholino, e.g., N-methylmorpholino or 2-methylmorpholino, di(lower alkyl)morpholino, e.g., 2,3-dimethylmorpholino, (lower alkoxy)morpholino, e.g., ethoxymorpholino, thiamorpholino, (lower alkyl)thiamorpholino, e.g., N-methylthiamorpholino or 2 - methylthiamorpholino, di(lower allyl)thiamorpholino, e.g., 2,3 - diethylthiamorpholino or 2,3-dimethylthiamorpholino, (lower alkoxy)-thiamorpholino, e.g., 2 - methoxythiamorpholino, piperazino, (lower alkyl)piperazino, e.g., $N^4$-methylpiperazino, 2-methylpiperazino or $N^4$-ethylpiperazino, di(lower alkyl)piperazino, e.g., 2,3-dimethylpiperazino, hydroxy-lower alkylpiperazino, e.g., hydroxyethylpiperazino, hexamethyleneimino and homopiperazino.

The preferred members of the class defined by Formula I are those wherein P is saturated, each R is hydrogen or chloro, especially the former, $R^1$ is di-lower alkylamino-lower alkylene, especially diethylaminoethyl and dimethylaminopropyl, $R^2$ is hydrogen, $R^3$ is either hydrogen or phenyl, especially the latter, $R^4$ is phenyl and $n$ is 1.

The new compounds of this invention may be produced by several alternate routes from esters of the formula (II) 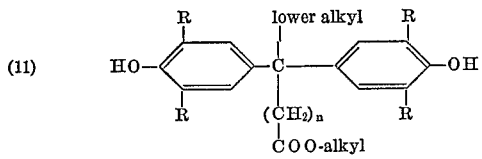

These esters are prepared by condensing the appropriate phenol with a keto ester as described in J. Orig. Chem. 23, 1004 (1958).

The ester of Formula II, may be treated with an excess of Grignard reagent, for example about 4 parts, and then treated with water to form a compound of the formula (III) 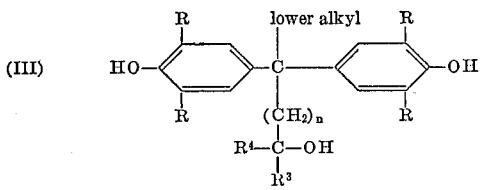

The product of Formula III is then reacted with a fatty acid anhydride such as acetic anhydride, when one mole of water is eliminated. The product is hydrolyzed with a base such as an alkali metal hydroxide to form a product of the formula (IV) 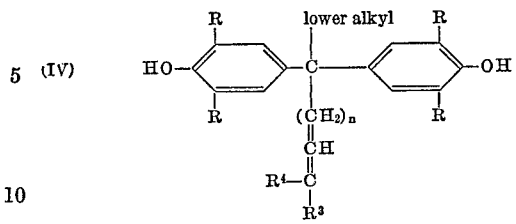

This product of Formula IV is reacted with an alkali metal alkoxide such as sodium ethoxide and the group $R^1$ is then introduced by reaction with about two proportions of a halide of the formula $R^1$-hal forming a compound of the formula (V) 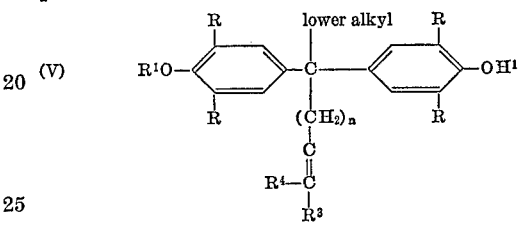

If a product is desired in which the side chain is saturated then the product of Formula V may be hydrogenated e.g., in the presence of a noble metal catalyst such as palladium oxide under conditions conventional for such as hydrogenation.

In the case of a product of Formula I wherein P is a saturated alkylene group bearing only a single substituent, i.e., $R^2$ and $R^3$ each represents hydrogen and $R^4$ represents phenyl, for example, a preferred procedure involves first converting the ester of Formula II to the corresponding acid e.g., with alkali metal hydroxide.

The phenolic groups are then protected, e.g., by reaction with an aralkyl halide, e.g., a phenyl-lower alkyl halide such as benzyl chloride. With the hydroxy groups protected, the carboxy group is converted to an acid halide group, e.g., by heating with thionyl chloride and this product is then treated with Grignard reagent, preferably not more than about 2 parts of the latter, and hydrolyzed to obtain a product of the formula (VI) 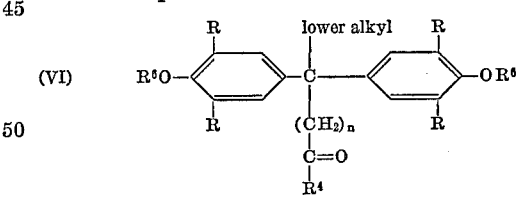

$R^6$ represents the protecting group, such as benzyl, which is removed, during the subsequent reduction of the keto group.

The keto group in Formula VI is reduced to a hydroxy group, for example with a noble metal catalyst such as palladium oxide, to yield a product of Formula III wherein $R^3$ is hydrogen. From this point on, the same procedure as described previously may be followed.

In each of the alternative processes described above, the group $R^1$ may be introduced initially instead of as the last step, e.g., by reacting the ester of Formula II with the halide $R^1$-hal, then otherwise proceeding as described before.

The bases of Formula I form acid addition salts by reaction with the common inorganic and organic acids. Such inorganic salts as the hydrohalides, e.g., hydrobromide, hydrochloride, hydroiodide, sulfates, nitrates, phosphates, borates, etc., and organic salts as acetate, oxalate, tartrate, malate, citrate, succinate, benzoate, pamoate, ascorbate, salicylate, theophyllinate, camphorsulfonate, alkanesulfonate, e.g., methanesulfonate, arylsulfonate, e.g., benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The new compounds of this invention are therapeutically active substances which are useful as hypocholesteremic agents. They inhibit cholesterol biosynthesis and regulate the cholesterol in the blood in animals. They are useful in the treatment of conditions such as atherosclerosis. These products may be administered orally or parenterally, e.g., at a dosage level of 2 to 40 mg./kg./day in single or divided doses, preferably 1 to 10 mg./kg. two to four times daily, in the form of tablets, capsules, elixirs, injectables, or the like by incorporating the base of Formula I or a physiologically acceptable acid addition salt thereof in a conventional vehicle according to accepted pharmaceutical practice.

The following examples are illustrative of the invention. All temperatures are expressed on the centigrade scale.

EXAMPLE 1

2,2′′′-[(1-methyl-4,4-diphenyl-3-butenylidene)bis (p-phenyeneoxy)]-bistriethylamine dioxalate (a) Preparation of α-[3,3-bis(p-hydroxyphenyl)butyl] benzhydrol.—To the Grignard reagent prepared from 142 g. of bromobenzene, 21.90 g. magnesium and 600 ml. of ether is added with stirring and refluxing a solution of 60 g. of methyl 4,4-bis(4′-hydroxyphenyl)-pentanoate. The mixture is refluxed for 3 hours, cooled and poured into a solution of 100 grams of ammonium chloride in one liter of water. The ether layer is separated and the ether distilled. The residue is boiled for two hours with 200 ml. of 10% aqueous sodium hydroxide solution. The solution is filtered and acidified with acetic acid. The precipitate is recrystallized from aqueous alcohol to give 23 g. of a white crystalline material melting between 118–119°.

(b) Preparation of 4,4′-(1-methyl-4,4-diphenyl-3-butenylidene)-diphenol.—A mixture of 20 g. of the product from 1(a) and 100 ml. of acetic anhydride is heated under reflux for 8 hours. The cooled solution is poured into ice-water. After several hours the solid is filtered off to give 25 g. of product M.P. 50–52°. This diacetoxy compound is boiled with 120 ml. of 10% sodium hydroxide solution for 8 hours. The cooled solution is filtered and when treated with carbon dioxide gives 16 grams of a solid. Upon recrystallization from aqueous alcohol 6.2 g. of crystalline product, M.P. 149–150°, are obtained.

(c) Preparation of 2,2′′′-[(1-methyl-4,4-diphenyl-3-butenylidene)-bis(p-phenyleneoxy)]bistriethylamine dioxalate.—A solution of 3 g. of 1(b) in 50 ml. of absolute ethanol is added to a sodium ethylate solution prepared by dissolving 0.358 g. sodium in 50 ml. of absolute ethanol. Then 2.2 g. of diethylaminoethyl chloride in 20 ml. ethanol is added. The mixture is stirred and refluxed for 7 hours and filtered. The filtrate is concentrated to give 5.1 g. of residue. This base is extracted with ether and the ethereal layer washed with water and dried over magnesium sulfate. The solution is filtered and treated with a slight excess of oxalic acid in ether to form the salt. The solid is filtered and recrystallized twice from methyl ethyl ketone to give 2.9 g. of dioxalate melting at 89–91°.

EXAMPLE 2

2,2′′′-[(1-methyl-4,4-diphenylbutylidene)bis(p-phenyleneoxy)bistriethylamine dioxalate (a) Preparation of 4,4′-(1-methyl-4,4-diphenylbutylidene)diphenol.—A solution of 10 g. 4,4′-(1-methyl-4,4-diphenyl-3-butenylidene)diphenol in 50 ml. of 95% alcohol is hydrogenated in the presence of 1 g. of palladium oxide. The mixture is filtered and the alcohol removed. The residue is recrystallized from 60 ml. of 50% aqueous ethanol to give 9 g. of white crystalline material melting between 159–160°.

(b) Preparation of 2,2′′′-[(1-methyl-4,4-diphenylbutylidene)bis(p-phenyleneoxy)]bistriethylamine dioxalate.—Six grams of the product from 2(a) in 50 ml. of ethanol is added with stirring to an alcoholic solution containing 1.38 g. of sodium. A solution of 5.3 g. of diethylaminoethyl chloride in 50 ml. of ethanol is then added as described in Example 1(c). The crude dioxalate (6.6 g.) is recrystallized twice from methyl ethyl ketone to give 4.3 g. of product melting at 86–89°.

EXAMPLE 3

2,2′′′-[(1-methyl-4-phenyl-3-butenylidene)bis(p-phenyleneoxy)]bistriethylamine, dioxalate salt (a) Preparation of 4,4-bis[4-benzyloxyphenyl]valeric acid.—A solution of diphenolic acid in 625 ml. of 95% ethanol is added to a mixture of 60 g. of sodium hydroxide in 400 ml. of water containing 200 ml. of benzyl chloride. The mixture is stirred and refluxed for 6 hours and allowed to stand overnight at room temperature. One-hundred grams of potassium hydroxide is added and the mixture is refluxed for 8 hours. The alcohol is distilled off. The cooled residue is acidified with hydrochloric acid and extracted with ether. The ether extracts are dried and the ether distilled. The residue is heated on the steam bath under high vacuum to remove benzyl chloride. The residue is then recrystallized from cyclohexane to give 188 g. of product melting at 96–97°.

(b) Preparation of 4,4-bis[p-benzyloxyphenyl]valerophenone.—To a benzene solution of 45 g. of the product from 3(a) is added 20 ml. of thionyl chloride and the solution is refluxed for 8 hours. The benzene and excess thionyl chloride are removed by distillation then finally by heating in vacuo.

To the Grignard solution prepared from 32 grams of bromobenzene, 5.0 g. of magnesium and 200 ml. of ether is added 19.6 g. of anhydrous cadmium chloride over a ten minute period. The mixture is refluxed with stirring for one hour. The ether is distilled from the reaction mixture and replaced with 200 ml. of dry benzene. The above acid chloride (49 g.) of 3(a) in 200 ml. of dry benzene is added slowly to the reaction mixture. After the addition is complete, the mixture is stirred and refluxed for one hour. The reaction mixture is cooled and decomposed with ice and water followed by sufficient 10% sulfuric acid. The aqueous layer is separated and extracted with two 100 ml. portions of benzene. The original benzene layer and the two benzene extracts are combined and washed successively with water, 5% sodium carbonate solution and water and then dried over magnesium sulfate. The benzene is removed and the residue when recrystallized from hexane gives 26 g. of a white crystalline product melting at 113–115°.

(c) Preparation of α-[3,3-bis(p-hydroxyphenyl)butyl]-benzyl alcohol.—A solution of 30 g. of the product from 3(b) in 200 ml. of ethanol is hydrogenated in the presence of 1 g. of palladium oxide as described in Example 2(a) to give 16 g. of product melting at 55–58°.

(d) Preparation of 4,4′-(1-methyl-4-phenyl-3-butenylidene)diphenol.—A mixture of 15 g. of the product from 3(c) and 100 ml. of acetic anhydride is reacted as described in Example 1(b) to give 11 g. of a white crystalline product.

(e) Preparation of 2,2′′′-[(1-methyl - 4 - phenyl-3-butenylidene)bis(p-phenyleneoxy]bistriethylamine dioxalate.—A solution of 10 g. of the product from 3(d) in 50 ml. of ethanol is added to 1.38 g. sodium in 50 ml. ethanol. A solution of 9.0 g. diethylaminoethyl chloride in 20 ml. alcohol is added with stirring. Following the procedure of Example 1(e) there is obtained 10 g. of a white crystalline product.

EXAMPLE 4

2,2'''-[(1-methyl-4-phenylbutylidene)bis(p-phenyleneoxy)]mistriethylamine dioxalate A solution of 10 g. of the product from 3(e) in 200 ml. of ethanol is hydrogenated in presence of palladium oxide. The mixture is filtered and the alcohol solution concentrated to 40 ml. Upon cooling, the crystals are filtered to give 9 grams of product.

EXAMPLE 5

1,1'-[(1-methyl-4-phenyl-3-butenylidene)bis(p-phenyleneoxytrimethylene)]-bispiperidine dioxalate By substituting 9.7 g. of piperidinopropyl chloride in the procedure of Example 3(e) there is obtained 8 grams of a white crystalline product.

EXAMPLE 6

3,3'-[(1-methyl-4,4-diphenyl-3-butylidene)-bis(3-chloro-4-phenyleneoxy)]bis[N,N-dimethylpropylamine]

By substituting ethyl 4,4-bis(3-chloro - 4 - hydroxyphenyl)pentanoate and dimethylaminopropyl chloride in the procedure of Example 1, the above compound is obtained.

EXAMPLE 7

2,2'''-[(1-ethyl-4,4-diphenyl-3-butenylidene)-bis(p-phenyleneoxy)]bistriethylamine By substituting ethyl 4,4-bis(p-hydroxyphenyl)hexanoate in the procedure of Example 1, the above compound is obtained.

EXAMPLE 8

3,3' - [(1 - methyl - 4,4 - diphenyl - 3 - butenylidene)-bis-(3 - methyl - 4 - phenyleneoxy)]bis[N,N - dimethylpropylamine]

By substituting ethyl 4,4-bis(3-methyl - 4 - hydroxyphenyl)pentanoate and dimethylaminopropyl chloride in the procedure of Example 1, there is obtained 3,3'-[(1-methyl-4,4-diphenyl - 3 - butenylidene) - bis(3-methyl-4-phenyleneoxy)]bis[N,N-dimethylpropylamine].

EXAMPLE 9

3,3' - [(1 - methyl - 4,4 - diphenyl - 3 - butenylidene)-bis-(3,5 - dimethylaminomethyl) - 4 - phenyleneoxy]bis-[N,N-dimethylpropylamine]

(a) Methyl 4,4-bis[3,5-bis(dimethylaminomethyl)-4-hydroxyphenyl]valerate.—To a solution of 60 g. of methyl 4,4-bis-(4-hydroxyphenyl)pentanoate and 188 g. of 40% aqueous methylamine are added with stirring at 10° 146 g. of 37% formaldehyde over a period of ½ hour. The solution is refluxed for 2 hours. The alcohol is removed and the mixture is extracted with ether. The ether is removed to give 40 g. of methyl 4,4-bis[3,5-bis-(dimethylaminomethyl)-4-hydroxyphenyl]valerate.

(b) By substituting compound 9a and dimethylaminopropyl chloride in the procedure of Example 1 there is obtained 3,3'-[(1-methyl - 4,4 - diphenyl-3-butenylidene)-bis(3,5-dimethylaminomethyl) - 4 - phenyleneoxy]bis-[N,N-dimethylpropylamine].

EXAMPLE 10

1,1-diphenyl-4,4-bis(p-methoxyphenyl)-1-pentene

A solution of 4,4'-(1-methyl-4,4-diphenyl-3-butenylidene) diphenol in methanol is treated with a slight excess of aqueous sodium hydroxide. An equivalent amount of dimethyl sulfate is slowly added with stirring at about 70°. After standing several hours, the mixture is diluted with several volumes of water. The product which separates is resuspended in dilute alkali, filtered and washed with water and dried to give the desired 1,1-diphenyl-4,4-bis(p-methoxyphenyl)-1-pentene.

EXAMPLE 11

1,1'-[(1-methyl-4-phenyl-3-butenylidene)bis-p-phenyleneoxytrimethyl)]-bismorpholine dioxalate By substituting morpholinopropyl chloride in procedure 3(e) there is obtained 1,1'-[(1-methyl-4-phenyl-3-butenylidene)bis(p - phenyleneoxytrimethylene)] - bismorpholine dioxalate.

EXAMPLE 12

1,1'-[(1-methyl-4-phenyl - 3 - butenylidene)bis(p-phenyleneoxytrimethylene)]bis-4-methylpiperazine dioxalate By substituting 4-methylpiperazinopropyl chloride in procedure 3(e) there is obtained 1,1'-[(1-methyl-4-phenyl-3-butenylidene)bis(p - phenyleneoxytrimethylene)]bis-4-methylpiperazine dioxalate.

EXAMPLE 13

2,2'''-[1-methyl-4,4-di-o-tolyl - 3 - butenylidene)bis(p-phenyleneoxy)]bis-triethylamine dioxalate By substituting o-bromotoluene in procedure 1(a) of Example 1 there is obtained 2,2'''-[1-methyl-4,4-di-o-tolyl - 3 - butenylidene)bis(p-phenyleneoxy)]bis-trimethylamine, dioxalate.

EXAMPLE 14

2,2'''-[1-methyl-4-o-tolyl-3-butenylidene-bis(p-phenyleneoxy)]bistriethylamine dioxalate By substituting o-bromotoluene in procedure 3(b) of Example 3 there is obtained 2,2'''-[1-methyl-4-o-tolyl-3-butenylidene-bis(p-phenyleneoxy)]bistriethylamine dioxalate.

EXAMPLE 15

2,2'''-[(1-methyl-4-cyclohexyl-3-butenylidene)bis(p-phenyleneoxy)]bistriethylamine dioxalate By substituting bromocyclohexane in procedure 3(b) of Example 3 there is obtained 2,2'''-[1-methyl-4-cyclohexyl-3-butenylidene bis(p - phenyleneoxy)]bistriethylamine dioxalate.

EXAMPLE 16

2,2'''-[(1-methyl-4,4-dicyclohexyl-3-butenylidene)bis(p-phenyleneoxy)]bistriethylamine dioxalate By substituting bromocyclohexane in procedure 1(a) of Example 1, there is obtained 2,2'''-[(1-methyl-4,4-dicyclohexyl - 3 - butenylidene)bis(p-phenyleneoxy)]bistriethylamine dioxalate.

EXAMPLE 17

2,2'''-[1-methyl-4,4-diphenyl-3-butenylidenebis-(3-methoxy-4-phenoxy)]bistriethylamine dioxalate (a) Ethyl 4,4-bis-(3-methoxy - 4 - hydroxyphenyl) pentanoate.—To a cooled mixture of 155 grams of o-methoxyphenol and 72 grams of ethyl levulinate is added dropwise with stirring 50 ml. of concentrated sulfuric acid. After 48 hours, the resulting oil is washed with water and then extracted into ether. The ethereal solution is washed with sodium carbonate solution, water and dried over magnesium sulfate. The ether is removed and the residue is ethyl 4,4-bis-(3-methoxy-4-hydroxyphenyl) pentanoate.

(b) By substituting the compound of 17a in 1(a) of Example 1 there is obtained 2,2'''-[1-methyl-4,4-diphenyl-3-butenylidenebis-(3-methoxy - 4 - phenoxy)]bistriethylamine dioxalate.

EXAMPLE 18

2,2'''-[(4-hydroxy-1-methyl-4,4-diphenylbutylidene) bis(p-phenyleneoxy)]bistriethylamine dioxalate (a) 4,4 - bis[p-(2-diethylaminoethoxy)phenyl]valeric acid, ethyl ester.—A solution of 99.0 g. (0.32 mole) of 4,4-bis(p-hydroxyphenyl)-valeric acid, ethyl ester in 200 ml. of dimethylformamide is treated portionwise with 30 g. (0.63 mole) sodium hydride (50% dispersion). The reaction is exothermic and the temperature of the mixture is maintained below 60° by cooling. After completion of the addition of the hydride, the slurry is heated to 80°, cooled to 40° and treated with 290 ml. of 2.2 N 2-diethylaminoethyl chloride (0.63 mole) in toluene. This mixture is gradually heated and then maintained at 100–110° for 3 hr. The major portion of the solvent is removed under reduced pressure; the residue is treated with 200 ml. of water and then extracted twice with 600 ml. portions of ether. The ether phases are combined and shaken with (1) 100 ml. of 5% sodium bicarbonate solution and (2) 50 ml. of water. The ether phase is dried over magnesium sulfate, charcoal is added and the mixture filtered. The filtrate is concentrated under reduced pressure to give 146 g. of syrupy material. A solution of 125.7 g. of the above material in 600 ml. of ether is added to a cold solution of 50 ml. of conc. hydrochloric acid in 300 ml. of water. The mixture is shaken, the organic phase is discarded and the aqueous phase is washed with 300 ml. of ether. The aqueous phase is treated with a cold solution of 30 g. of sodium hydroxide in 100 ml. of water. The organic phase is extracted with 400 ml. portions of ether (three times). The ether phases are combined, dried over magnesium sulfate, filtered and the filtrate concentrated under reduced pressure to give 91.3 g. (66%) of pale orange syrupy product.

(b) 2,2′′′-[(4-hydroxy-1-methyl - 4,4 - diphenylbutylidene)bis(p - phenyleneoxy)]bistriethylamine dioxalate.—An ethereal solution of about 0.75 mole of phenyl magnesium bromide (prepared from 18.0 g. of magnesium turnings, 120 g. of bromobenzene and 500 ml. of ether) is treated with a solution of 80.0 g. (0.16 mole) of the ester from (a) in 500 ml. of dry tetrahydrofuran. Slight cooling is used to control the exothermic reaction. The resulting solution is refluxed for 5 hr., allowed to stand overnight at room temperature (a crystalline material separates from solution) and then added to a cold solution of 150 g. of ammonium chloride in 500 ml. of water. The mixture is diluted with 500 ml. of ether, shaken and the layers separated. The aqueous layer is extracted twice with 300 ml. portions of ether. The organic phases are combined, washed with 100 ml. of water, dried over magnesium sulfate and filtered. Evaporation of the solvent at reduced pressure gives 104 g. of yellow-orange residue which is the free base. Part of this material (83.4 g.) is dissolved in 150 ml. of ethanol and treated with a solution of 24 g. of oxalic acid in 50 ml. of ethanol and the resulting solution is diluted with 1.2 l. of ether to give a pale yellow oily product. After cooling overnight, the mother liquor is decanted and the oily material is triturated with 500 ml. portions of ether (twice) and then with 300 ml. of acetone. The latter solvent partially dissolves the oily oxalate and the material begins to slowly crystallize. After cooling for two days in the cold, the nearly colorless granular material is filtered and washed with cold acetone and then with ether, M.P. 92–94° (dec.).

EXAMPLE 19

2,2′ - [(4 - hydroxy-1-methyl-4,4-diphenylbutylidene)bis (p - phenyleneoxy)]bis(N,N - dimethylethylamine)dihydrochloride (a) 4,4-bis-[p-(2-dimethylaminoethoxy)phenyl] valeric acid, methyl ester.—Sixty grams (0.2 mole) of 4,4-bis (p-hydroxyphenyl) valeric acid, methyl ester 20 g. (0.42 mole) of 50% sodium hydride and 250 ml. of 1.7 N 2-dimethylaminoethyl chloride (0.42 mole) in toluene are reacted in 175 ml. of dimethylformamide as described in Example 18. The bulk of solvents is removed in vacuo on a rotary evaporator at 70° and the cooled residue is shaken with 150 ml. of water and 400 ml. of ether. The layers are separated and the aqueous phase extracted twice more with 200 ml. portions of ether. The combined ether layers are washed with 100 ml. of water and added to a cold solution of 38 ml. of conc. hydrochloric acid in 400 ml. of water. After shaking, the layers are separated and the aqueous phase is washed with ether, cooled and treated with a cold solution of 20 g. of sodium hydroxide in 100 ml. of water. The liberated base of the ether gives 48.5 g. (55%) of syrupy material.

(b) 2,2′ - [(4 - hydroxy - 1-methyl-4,4-diphenylbutylidene)bis(p - phenyleneoxy)]bis(N,N - dimethylethylamine)dihydrochloride.—Forty-eight grams (0.11 mole) of the ester from (a), dissolved in 300 ml. of tetrahydrofuran is reacted with the Grignard reagent prepared from 12.5 g. (0.52 g. atoms) of magnesium turnings and 82 g. (0.52 mole) of bromobenzene in 300 ml. of anhydrous ether as described in Example 18. The yield of extremely viscous base is 66 g.

A portion of the base (30 g.) is taken up in 120 ml. of absolute alcohol, cooled, treated with 13 ml. of 7.4 N alcoholic hydrogen chloride and diluted with ether to precipitate the dihydrochloride as a gum which gradually crystallizes when rubbed under 100 ml. of acetone. The material is dissolved in 100 ml. of chloroform, filtered and reprecipitated with ether. The material is then suspended overnight in 300 ml. of acetone, collected and air-dried to give the final product; M.P. 148–150° (dec.).

EXAMPLE 20

1,1′ - [(4 - hydroxy - 1 - methyl-4,4-diphenylbutylidene)-bis(p-phenyleneoxyethylene)]bis pyrrolidine dihydrochloride hydrate (a) 4,4 - bis[p-[2 - (1 - pyrrolidinyl)ethoxy]phenyl] valeric acid, methyl ester.—Seventy-eight grams (0.26 mole) of 4,4 - (p-hydroxyphenyl)valeric acid, methyl ester, 26 g. (0.54 mole) of 50% sodium hydride and 73 g. (0.54 mole) of N-2-chloroethyl)pyrrolidine (released from the hydrochloride; B.P. 67°/12 mm.) are reacted in 250 ml. of dimethylformamide as described in Example 19.

(b) 1,1′ - [(4 - hydroxy - 1 - methyl-4,4-diphenylbutylidene)bis(p-phenyleneoxyethylene)]bis pyrrolidine dihydrochloride hydrate.—Forty-five grams (0.091 mole) of the ester from (a), dissolved in 250 ml. of tetrahydrofuran is reacted with the Grignard reagent prepared form 10.5 g. (0.43 g. atom) of magnesium turnings and 68 g. (0.43 mole) of bromobenzene in 250 ml. of ether as described in Example 18.

The glass-like base (59 g.) is taken up in 250 ml. of absolute alcohol, cooled, treated with 23 ml. of 7.4 N alcoholic hydrogen chloride and diluted with several volumes of ether to precipitate the dihydrochloride as a gum. The liquor is decanted off and the material is washed twice by decantation with ether, taken up in 200 ml. of chloroform, filtered and poured gradually into 1.5 l. of stirred ether. The crude non-hygroscopic solid is rubber under butanone, then under ether repeatedly, collected, pulverized and dried in vacuo, M.P. 128–131° (foaming).

EXAMPLE 21

1,1′ - [(4-hydroxy-1,4-dimethylpentylidene)bis(p-phenyleneoxyethylene)]bispyrrolidine dicitrate A solution of 31.5 g. (0.064 mole) of 4,4-bis[p-[2-(1-pyrrolidinyl)ethoxy]phenyl]valeric acid, methyl ester from Example 20(a) in 175 ml. of tetrahydrofuran is added dropwise with stirring to 100 ml. of a 3 M ethereal solution of methyl magnesium bromide so as to maintain moderate refluxing. The product is worked up as described in Example 18. The base (31.8 g.) is taken up in 75 ml. of absolute alcohol, treated with a solution of 27.5 g. of citric acid hydrate in 50 ml. of alcohol and diluted with ether to precipitate the dicitrate as a gum which becomes granular on rubbing and cooling. The material is dissolved in 200 ml. of methanol, filtered, reprecipitated with ether and granulated by repeated rubbing under acetone and ether, M.P. 78–81° (foaming).

By following the above procedure but substituting for the methyl magnesium iodide the Grignard reagents which follow, the corresponding products are obtained: isopropyl magnesium iodide, cyclopropylmethyl magnesium bromide, benzyl magnesium chloride, m-trifluoromethylphenyl lithium, thienyl magnesium bromide, 2-pyridyl magnesium bromide, γ-picolyl lithium, allyl magnesium bromide and propargyl magnesium bromide.

What is claimed is:

1. A compound of the formula:

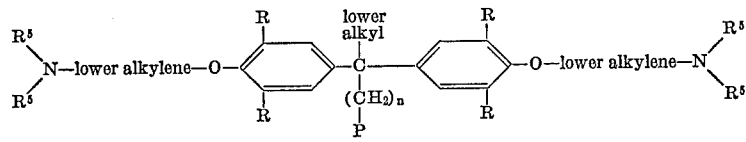

wherein P represents a radical of the group consisting of:

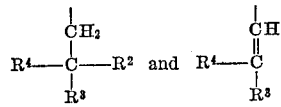

each R is a member of the group consisting of hydrogen, hydroxy, nitro, lower alkyl, lower alkoxy, lower alkanoyl, halo and diloweralkylamino-lower alkylene; $R^2$ is a member of the group consisting of hydrogen and hydroxy; $R^3$ is a member of the group consisting of hydrogen, lower alkyl, lower alkenyl, lower alkynyl, $(R)_m$-phenyl, $(R)_m$-naphthyl, $(R)_m$-phenyl-lower alkyl, $(R)_m$-naphthyl-lower alkyl, cycloalkyl of 3 to 7 carbon atoms, and cycloalkyl-lower alkyl, wherein the cycloalkyl has 3 to 7 carbon atoms; $R^4$ is a member of the group consisting of lower alkyl, lower alkenyl, lower alkynyl, $(R)_m$-phenyl, $(R_m$-naphthyl, $(R)_m$-phenyl-lower alkyl, $(R)_m$-naphthyl-lower alkyl, cycloalkyl of 3 to 7 carbon atoms, and cycloalkyl-lower alkyl, wherein the cycloalkyl has 3 to 7 carbon atoms; each $R^5$ is a member of the group consisting of hydrogen, lower alkyl, hydroxy-lower alkyl, and phenyl-lower alkyl; $m$ is an integer from 0 to 3; and $n$ is an integer from 1 to 5; and acid-addition salts thereof.

2. A compound of the formula

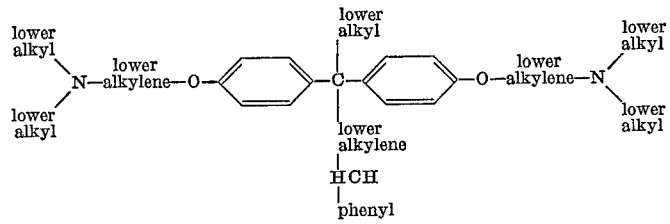

3. A compound of the formula

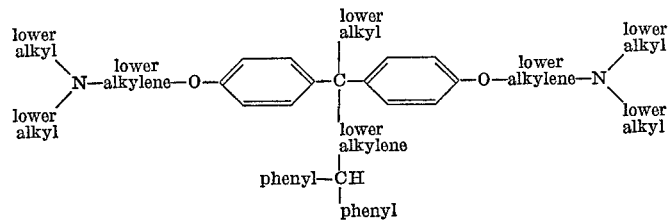

4. A compound of the formula

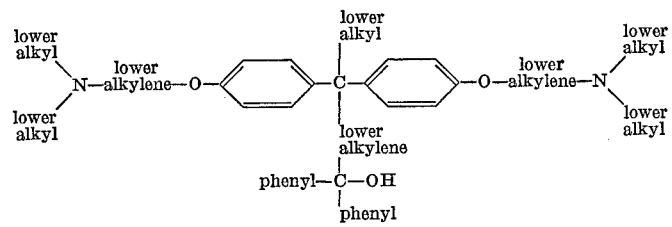

5. A compound of the formula

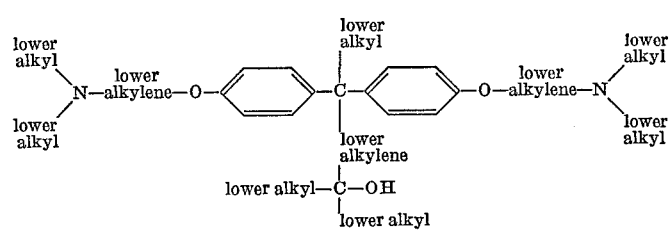

6. A compound of the formula

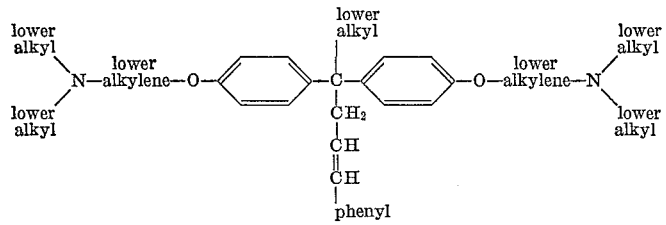

7. An acid-addition salt of a compound of claim 4.
8. 2,2''' - [(1 - methyl - 4,4 - diphenyl - 3 - butenylidene)bis-(phenyleneoxy)]bis triethylamine.
9. 2,2''' - [(1 - methyl - 4,4 - diphenylbutylidene)bis-(p-phenyleneoxy)]bis triethylamine.
10. 2,2''' - [(4 -hydroxyl - methyl - 4,4 - diphenylbutylidene)-bis-(p-phenyleneoxy)]bis-triethylamine.
11. An acid addition salt of a compound of claim 3.
12. The dioxalate of the compound of claim 8.
13. The dioxalate of the compound of claim 9.
14. The dioxalate of the compound of claim 10.

References Cited
UNITED STATES PATENTS

| | | | |
|---|---|---|---|
| 3,243,461 | 3/1966 | Palopoli et al. | 260—570 |
| 3,250,767 | 5/1966 | Bencze | 260—570X |

ROBERT V. HINES, Primary Examiner

U.S. Cl. X.R.

424—244, 246, 248, 250, 253, 263, 267, 274, 280, 330

PO-1050
(5/69)

UNITED STATES PATENT OFFICE
CERTIFICATE OF CORRECTION

Patent No. 3,576,874          Dated   April 27, 1971

Inventor(s) Josef Fried and Edward Joseph Pribyl

It is certified that error appears in the above-identified patent and that said Letters Patent are hereby corrected as shown below:

such--. Column 3, line 59, "J. Orig. Chem." should read--J. Org. Chem.--. Column 4, line 20,

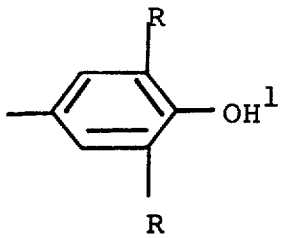   should read   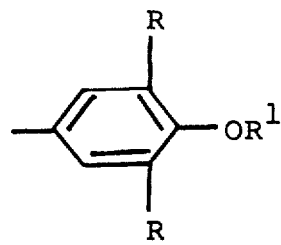

Column 5, line 24, "(p-phenyeneoxy)" should read--(p-phenyleneoxy)--. Column 7, line 2, "mistriethylamine" should read--bistriethylamine--. Column 8, line 2, "bis-p-phenyleneoxytrimethyl" should read--bis-p-phenyleneoxytrimethylene--. Column 13, line 17, "[(4-hydroxyl" should read [(4-hydroxy-1- --.

Signed and sealed this 2nd day of November 1971.

(SEAL)
Attest:

EDWARD M. FLETCHER, JR.          ROBERT GOTTSCHALK
Attesting Officer                Acting Commissioner of Patents